March 15, 1966 V. W. WALL 3,241,141
TERRAIN VIEWING RADAR SYSTEM
Filed Nov. 21, 1957 3 Sheets-Sheet 1

INVENTOR.
VIRGIL W. WALL
BY Frederic B. Schaaf
ATTORNEY

INVENTOR.
VIRGIL W. WALL
BY
ATTORNEY

INVENTOR.
VIRGIL W. WALL

United States Patent Office 3,241,141
Patented Mar. 15, 1966

3,241,141
TERRAIN VIEWING RADAR SYSTEM
Virgil W. Wall, Santa Barbara, Calif., assignor to
North American Aviation, Inc.
Filed Nov. 21, 1957, Ser. No. 699,149
6 Claims. (Cl. 343—16)

This application relates to aviation aids and safety of aviation. An object of the invention is to provide the pilot of an aircraft an indication of the terrain obstacles along and on each side of the projected flight path.

A further object is to enable the pilot to fly as close as safely possible to the ground and to provide a warning in case of inadequate ground clearance or an unsafe flight path.

A more specific object of the invention is the utilization of high frequency radiant energy for exploration of terrain and formation of indications of relative elevation.

Other and further objects, features, and advantages of the invention will become apparent as the description proceeds.

In carrying out the invention in accordance with a preferred form thereof, a monopulse radar system is used which is beamed upon the ground with the monopulse receiving antenna at a predetermined depression angle. A special receiver is employed in which error signals are received, mixed with sum signals. The latter are caused to vary in strength and polarity according to range in such a manner that a net zero signal appears upon an oscilloscope screen for all ranges across the screen when the aircraft is in level flight at a fixed altitude above a level terrain. However, if any elevations occur in the terrain ahead of the aircraft, these appear upon the screen as signals above the horizon line of the screen simulating the rises in terrain to indicate to the pilot the presence and location of such rises in terrain in terms of range ahead of the aircraft.

A better understanding of the invention will be afforded by the following detailed description considered in conjunction with the accompanying drawings in which FIGURE 1 is a graph illustrating the principle of operation of the invention, showing the normal boresight of the monopulse antenna in relation to the ground clearance plane and obstructions arising above the clearance plane.

Like reference characters are utilized throughout the drawing to designate like parts.

In monopulse radar systems such as described, for example, in the copending application of Robert M. Ashby, Serial No. 216,145, filed March 17, 1951, now Patent Number 2,956,275, very precise indications of the angular position of a target are obtained by comparisons of intensity of reflections in two receiving antenna-pattern lobes. A difference, or error signal, received through an error channel, provides an indication of the angular deviations of a target from the boresight of the antenna. In another channel in which the reflections detected by the receiving antenna are combined additively instead of subtractively, indications of target range are obtainable by determining the time required for a transmitter pulse to be returned to the antenna from the target as a reflection. However, the intensity of the signal in the range, or sum channel, is also a function of range.

Figure 1:
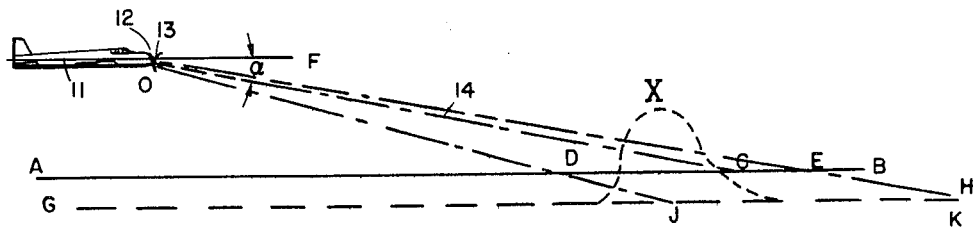

In apparatus embodying the present invention, the boresight of a monopulse antenna is directed obliquely toward the ground, and the surface of the ground itself is the "target." As illustrated schematically in FIGURE 1, an aircraft 11 has a monopulse radar antenna 13 mounted in the nose of 12 of the aircraft, or in some other appropriate position. The antenna 13 is represented schematically by a paraboloidal reflector, greatly exaggerated in size in comparison with the aircraft 11, for enabling the invention to be illustrated more clearly.

With the aircraft 11 in level flight, the depression angle at which this antenna 13 is mounted causes the normal boresight 14 of the antenna to make an angle COF with the horizontal line of flight OF.

The system is so designed as to provide a warning whenever an obstruction such as a hill X appears above an arbitrarily selected clearance plane represented by a horizontal line AB, which is a fixed distance below the aircraft when it is in level flight. The normal boresight 14 intercepts this line AB at C. The actual ground surface is represented by a broken line GXH, which lies along a horizontal line GH, except at the hill X in the example shown by way of illustration.

In a monopulse system, the radiated energy transmitted by the antenna diverges to some extent so that with the antenna depressed as shown, if the hill X were not present, usable monopulse reflections would be received from the ground over a range from the points J to K. Along the clearance plane AB, the linear range of usable elevation monopulse returns extends between points D and E.

Figure 2:
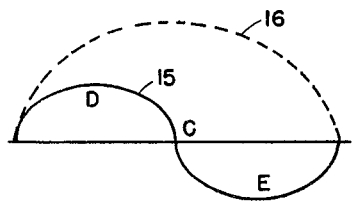
FIGURE 2 is a graph illustrating the shape of the curve, representing strength of difference or error signals plotted vertically against the horizontal projection of range plotted horizontally in comparison with sum or range signals plotted according to the same scale.

The output of the error channel of the monopulse receiver is represented by the full line curve 15 of FIGURE 2 where the points D, C, and E on the curve correspond to correspondingly lettered points in FIGURE 1. The output of the range channel is represented by the dashline curve 16.

Means are provided for combining the outputs of the range and error channels represented by curves 15 and 16 differentially in such a way that when the ground surface is horizontal and free from obstructions, no indication is given by a warning device; but in the event of the presence of obstructions, the balance is upset and the warning indication is provided.

Figure 5:
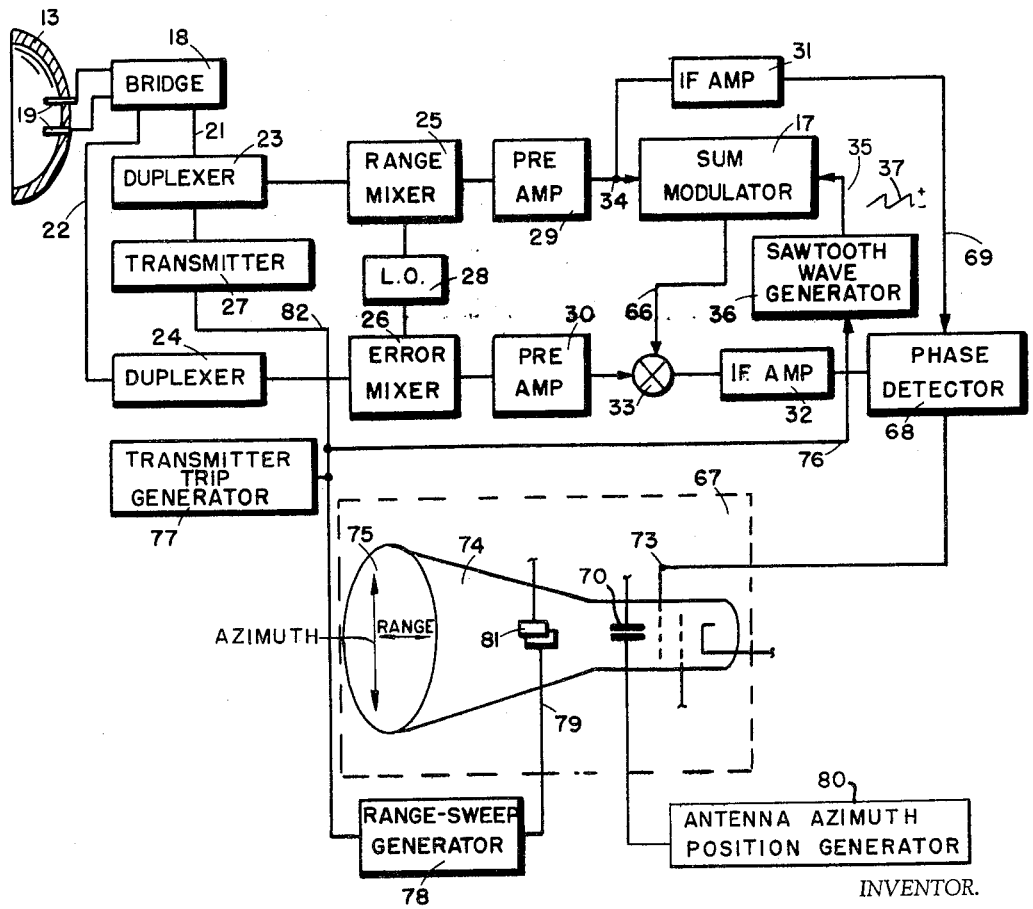
FIGURE 5 is a block diagram illustrating the principle of operation of the resolution of signals from monopulse range and error amplifiers for producing a warning signal in the event the pilot drops below a safe clearance plane in relation to ground obstructions.

In the system of FIGURE 5, a modulator 17 is provided for combining the range output in such a proportion with the error channel output for each successive range as normally to produce a zero output. The manner in which this is accomplished will be explained more in detail hereinafter. In the system of FIGURE 5, as in conventional monopulse systems of the type described in the aforesaid pending application of Robert M. Ashby, a bridge 18 is interposed between two or more feed elements 19, of the antenna 13, and a pair of channels 21 and 22. The latter are connected through duplexers 23 and 24 to range and error mixers 25 and 26 of the monopulse range and error receivers respectively. The range duplexer 23 serves for coupling a transmitter 27 to the range channel 21 and the antenna 13 in such a manner as not to interfere with the reception through the channel 21, as will be understood by those skilled in the art, and explained more fully in the aforesaid copending application of Robert M. Ashby.

A single local oscillator 28 serves both the range and error mixers 25 and 26, and preferably preamplifiers 29 and 30 are employed in the range and error channels respectively. Intermediate frequency amplifiers 31 and 32, for the range and error channels, are provided as in the ordinary monopulse radar detection system; however, in accordance with the present invention, a sum circuit 33 is provided for combining a portion of the output of the range preamplifier 29 with the output of the error preamplifier 30 in the intermediate-frequency amplifier 32. The modulator 17 serves to control the portion of the output of preamplifier 29 which is supplied to the sum circuit 33. The sum circuit 33 combines this controlled portion of the range signal with the error signal from preamplifier 30 and feeds the combined signals to the intermediate frequency amplifier 32. The modulator 17, as illustrated, has a carrier or driver input channel 34 from the output of the preamplifier 29, and an input channel 35 from a generator 36 of a suitable modulating waveform.

Figure 6:
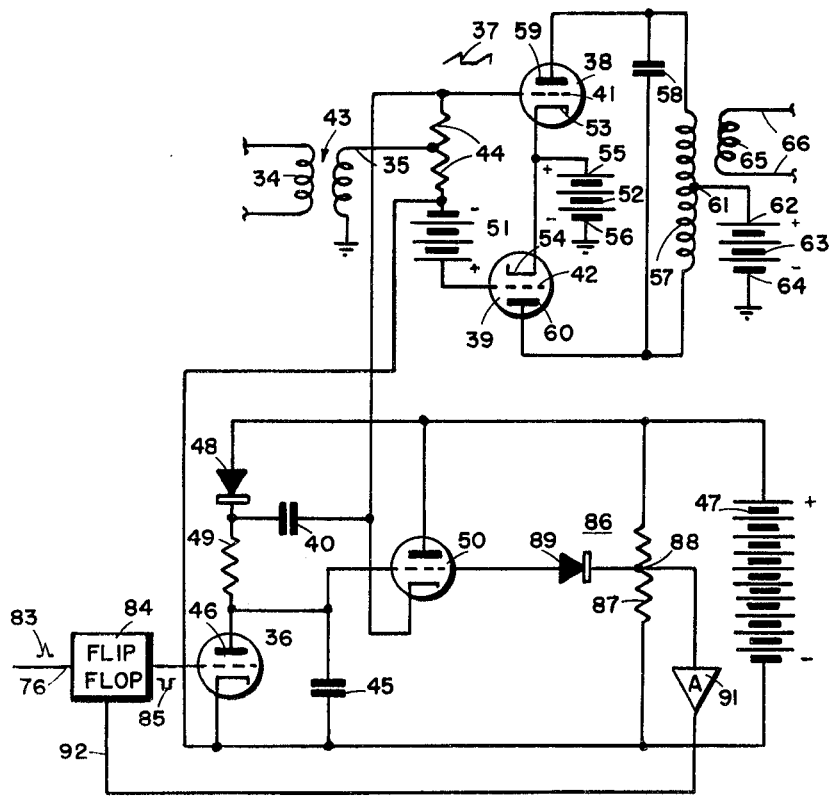
FIGURE 6 is a circuit diagram of a modulator which may be employed in the system illustrated in FIGURE 5.

Although, if desired, a special waveform source may be employed, the invention is not limited thereto, and satisfactory results may be obtained where the modulating signal takes the form of a saw tooth wave generator, producing an output wave 37, varying between approximately equal positive and negative peak values. The sum circuit 33 may be of conventional form such as described, for example, by Seely: Electron Tube Circuits (1950) §§ 8–2, pp. 148–150. A form of modulator and saw tooth wave generator which may be employed is illustrated in FIGURE 6. The modulator 17 may take the form of a balanced modulator, combining a pair of electronic valves 38 and 39, connected in opposed phased relationship with input to a pair of grids 41 and 42 from the drive channel 34, a coupling transformer 43 and a coupling resistor 44.

The resistor 44 constitutes the element in which the output wave form of the saw tooth wave modulation generator 36 appears. Any suitable type of saw tooth generator may be employed such as a phantastron circuit or a boot strap circuit. For example, as shown, a boot strap circuit is employed comprising a charging condenser 45 normally short circuited by a triode 46 connected across a source of condenser charging current 47 in series with a diode feedback switch 48 and a relatively high-resistance charging resistor forming an anode resistor 49. For causing the condenser 45 to charge linearly instead of exponentially, a feedback cathode follower tube 50 is provided which has its input grid connected to the anode of the condenser discharging triode 46. The negative terminal of the diode switch 48 is in turn coupled to the cathode of the cathode follower 50 by means of a condenser 40. The resistor 44 constitutes the cathode resistor of the cathode follower tube 50.

A source of negative voltage such as a battery 51 may be connected in series with a cathode resistor 44 between the grid 41 of the tube 38 and the grid 42 of the tube 39 for causing the wave applied to the grids 41 and 42 to have both negative and positive peaks (the battery 51 having potential difference equaling approximately one half the voltage for which the triode 46 is set to break down). It will be understood, however, that the separate battery 51 need not be employed if the grids 41 and 42 are biased sufficiently more negatively by increasing the voltage of the battery 52 an equivalent amount.

The valves 38 and 39 are biased to cut off potential so that at all times one or the other is non-conductive because signals of opposite polarity appear in the grids 41 and 42. As shown, the electronic valves 38 and 39 are cathode biased by connection of cathodes 53 and 54 to the positive terminal 55 of the bias source 52 which has a grounded negative terminal 56. Although the invention is not limited to any particular type of modulator, in the circuit shown by way of illustration, a tuned plate circuit is illustrated comprising an inductance 57 in parallel with a condenser 58 connected between anodes 59 and 60 of the valves 38 and 39 respectively. Inductance 57 is provided with a mid terminal 61 which is connected in turn to a positive terminal 62 of a source of the plate current 63, having a grounded negative terminal 64. By way of illustration, a secondary winding 65 is shown for coupling the output of the modulator coil 57 to an output channel 66, represented by separate conductors in FIGURE 6 and a single line in FIGURE 5, supplying the sum circuit 33.

Although, if desired, a suitable warning device such as an indicator 67 may be connected directly to the output of the intermediate frequency error channel amplifier 32, preferably a phase detector 68 is interposed, having a reference input channel 69 from the output of the intermediate frequency amplifier 31.

Figure 3:
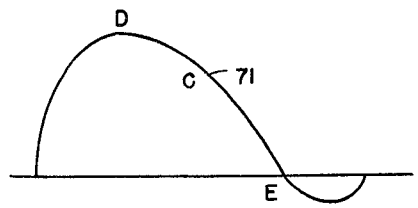
FIGURE 3 is a curve illustrating the electrical result of combining sum and error signals in a single circuit with a predetermined relationship between the magnitude of the sum and error signals.
Figure 4:
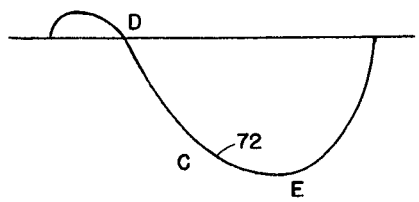
FIGURE 4 is a curve corresponding to FIGURE 3, but with the polarity of the sum signals reversed.

Referring to FIGURES 3 and 4, it will be seen that when the curve 16 is combined with the curve 15 with full amplitude, an output resultant wave is produced the shape of which is inverted by reversing the polarity of the range signal. If the waves are combined additively, a wave 71 is obtained, as shown in FIGURE 3. On the other hand, if the wave 16 is combined subtractively with the wave 15, a resultant wave 72, such as illustrated in FIGURE 4, is obtained. The waves 71 and 72 represent the effect of applying the maximum positive and negative voltages of the saw tooth wave 37 respectively to the modulator 17. However, by progressive variation in magnitude of the fraction of the range signal applied to the sum circuit 33, the boresight (the point at which the signal changes from positive to negative) can be moved from point D to point E since the sum of the error signal and the varying fraction of the range signal will be zero for returns from plane A–B between points D and E.

If the full negative sum is added (FIGURE 4) at the time signals return from point D, and, during the additional time required for signals to return from the point E, this signal is reduced to zero and then made positive (FIGURE 3), the output will go from FIGURE 4 through FIGURE 2 to FIGURE 3 as signals are received from points D, C, and E in order. For returns from each of these points, a zero combined signal will result. Signals from any points below the plane A–B (G–H for example) will occur later in time than the points mentioned above, and hence will always return negative composite signals. Any signal from above the line A–B, however, will return signals earlier in time and hence will return positive signals. Thus, the rise in the ground at X will return a signal which is positive.

For practical purposes, it is found that sufficiently exact correlation between change in proportion of the sum signal and range or time is accomplished by saw tooth wave modulation. If an obstruction on the ground interferes with the normal reflections from the ground back to the antenna 13, the shapes of the curves 15 and 16 are altered at the point corresponding to the location of the hill X. Consequently, a positive signal will be produced in the indicator 67 advising the pilot of the presence of the obstruction.

The output of the error intermediate frequency amplifier 32 may be supplied to a conventional cathode ray screen with signal presentation of B type, for example. In order to differentiate between positive and negative signals (returned from points respectively above and below plane A–B), a phase detector 68 is interposed; and the output of the phase detector 68, supplied to beam intensifying terminals 73 of a cathode-ray oscilloscope 74, causes a bright spot on the screen 75 to be produced at the point representing the range of the obstruction and thereby to warn the pilot of location and range. As is well known, the beam intensifying terminals are responsive only to positive signals whereby beam intensification occurs only for targets above line A–B. Therefore, the display comprises bright spots on the screen positioned to correspond only to those targets or ground obstructions which protrude above plane A–B. Targets on or below plane A–B return zero or negative signals which will not cause intensification of the cathode ray of the display. Reference voltage for the phase detector 68 is derived from the IF amplifier 31.

Suitable means are provided for synchronization of pulses emitted by the transmitter 27 and the range sweep of the indicator 67 with the saw tooth modulating wave 37. This is represented schematically in FIG. 5 by a line 76 connecting a transmitter trip wave generator 77 to the synchronizing terminal of the saw tooth wave modulation generator 36 and also to a range sweep generator 78. An output line 79 from the range sweep generator 78 supplies voltage, with a suitable portion of the voltage wave blanked out, to range sweep plates 81 of the cathode ray tube 74. In accordance with conventional B-scan presentation a signal from an antenna azimuth position generator 80 is supplied to azimuth deflection plates 70. An output line 82 from the transmitter trip wave generator 77 is provided to excite the transmitter 27 to emit pulses of microwave energy so that the reflection therefrom will be synchronized with the saw tooth wave generators in the generators 36 and 78.

The manner in which a sharp pulse 83, appearing on the line 76 of the transmitter trip generator 77, synchronizes the boot strap type of saw tooth wave generator 36 is illustrated in FIG. 6, where a bistable circuit such as a flip-flop 84, for example, has one of its control terminals connected to the line 76 and its output connected to the grid of the condenser discharging triode 46. The trip wave 83 applied to the flip-flop 84 shifts the flip-flop 84 to a state in which a negative square wave appears on the grid of the tube 46 to cut off conduction in the tube 46 thus permitting the condenser 45 to charge through the charging resistor 49 and the switching diode 48 from the source 47.

A sweep stopper circuit 86 is provided for rendering the tube 46 conductive and short-circuiting the condenser 45 after it has attained a predetermined potential difference, the desired maximum amplitude of the saw tooth modulating wave 37. The sweep stopper circuit 86 comprises a voltage-divider resistor 87 connected across the source of condenser charging current 47 having a sweep-wave voltage amplitude setting terminal 88 connected to the grid of the tube 50 and the anode of the tube 46 through a switching diode 89. In consequence, when the voltage of the condenser 45 reaches a certain predetermined level, the diode 89 becomes conducting to raise the potential of the point 88. This positive potential pulse is amplified through an amplifier 91 and applied to the alternative control electrode 92 of the flip-flop 84 for reversing the potential of the output wave 85, thereby raising the potential of the grid of the tube 46, causing it to become conducting and to short circuit again the charging condenser 45.

It will be understood that if it is desired, a plan-position presentation may also be provided on the oscilloscope, similar in appearance to that illustrated in FIGURES 24–23 of Standard Handbook for Electrical Engineers, 8th edition, 1949, p. 2172. Other methods of displaying or presenting the warning information to the pilot will be evident to one skilled in the art. If desired also, the arrangement illustrated may be incorporated in a complete system including means for setting the level of the clearance plane A–B, as well as means for compensating for the angle of attack of the aircraft 11, so that the system may be employed without requiring the pilot to maintain level flight.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a terrain elevation indicator, a monopulse system comprising an antenna and a receiver with range and error channels coupled with the antenna, a warning indicator, a sum circuit having first and second input channels and an output channel, a phase detector referenced from the receiver range channel and having an output connected with the warning indicator, an intermediate frequency amplifier connected between said sum circuit output channel and said phase detector, the first input channel being connected to the receiver error channel, a modulator having a range input channel coupled to the receiver range channel, having an output channel connected to the second input channel of the sum circuit and having a modulating input channel, and a modulating generator coupled to said modulating input channel for progressively varying the proportion of the output of the receiver range channel supplied to the sum circuit, normally to effect balance between the instantaneous inputs to the sum circuit.

2. In a terrain elevation indicator, a monopulse system having an antenna carried above ground with a boresight directed obliquely toward the ground for receiving reflections from the ground at elevations in the terrain, a transmitter for transmitting radar impulses to the antenna, a pair of receiver channels, a bridge coupling the receiver channels to the antenna, a duplexer coupling the transmitter to one of the channels to form a monopulse radar system, a phase detector having an input from one of the receiving channels and referenced from the other receiving channel and having an output, a warning detector coupled to said phase detector output, a summing device having a first input circuit and an output circuit interposed in the input of the phase detector and having a second input circuit, a modulated amplifier interposed between the other receiving channel and said second input circuit for normally combining sufficient received energy from the other channel for producing a null indication in the warning indicator.

3. A monopulse radar system comprising an antenna having a multi-lobe pattern, means coupled to said antenna for additively and subtractively combining energy received in different antenna lobes, a receiver coupled with said energy combining means and having range and error channels for receiving range and error signals respectively representing additively and subtractively combined energy, means for cyclically effecting variation of amplitude and polarity of said range signals, and means for combining said error channel signals with said varied range signals.

4. A monopulse radar system comprising an antenna having a multi-lobe radiation pattern, receiving means responsive to said antenna for producing range and error signals respectively representing the sum and difference of energy received in different lobes of said antenna, modulator means for effecting a repetitive time varying change in amplitude and polarity of said range signal and means responsive to said modulator means for combining said changed range signal with said error signal.

5. A monopulse radar system comprising an antenna having a multi-lobe radiation pattern, receiving means responsive to said antenna for producing range and error signals respectively representing the sum and difference of energy received in different lobes of said antenna, means for progressively varying the amplitude of said range signals in accordance with target range, and means for summing said error signal with said progressively varied range signal.

6. A monopulse radar system comprising an antenna having a multi-lobe pattern, means coupled with said antenna for additively and differentially combining energy received in different antenna lobes, a receiver coupled with said energy combining means for receiving range and error signals respectively representing said additively and differentially combined energy, a generator of modulating signals, a modulator having as inputs said range signals and said modulating signals, a summation device having said error signals as a first input thereto and having a second input from said modulator, a phase detector, means for coupling signals from said summation device and the range signals from the receiver to the phase detector as inputs thereto, and an indicator responsively coupled to the phase detector.

References Cited by the Examiner

UNITED STATES PATENTS

| | | | |
|---|---|---|---|
| 2,552,527 | 5/1951 | Dean et al. | 343—16 |
| 2,682,656 | 6/1954 | Phillips | 343—16 |
| 2,817,835 | 12/1957 | Worthington | 343—16 |
| 2,831,969 | 4/1958 | Jankowski | 343—16 |

CHESTER L. JUSTUS, *Primary Examiner.*

NORMAN H. EVANS, *Examiner.*